Patented Jan. 30, 1923.

1,443,881

UNITED STATES PATENT OFFICE.

HERBERT LANGWELL, OF STOCKTON-ON-TEES, ENGLAND.

FERMENTATION OF CELLULOSE.

No Drawing.   Application filed September 29, 1919.   Serial No. 327,265.

*To all whom it may concern:*

Be it known that I, HERBERT LANGWELL, a subject of the King of Great Britain, residing in Stockton-on-Tees, England, have invented certain new and useful Improvements in the Fermentation of Cellulose, of which the following is a specification.

It is doubtful whether cellulose itself is capable of the well-known anærobic butyric fermentation. The saccharifiable celluloses are liable to this change under proper selection of bacteria and careful sterilization of the material fermented. On the other hand, direct fermentation of cellulose with production of acetic acid as the main fatty acid is possible and this fermentation has frequently been studied; however, the statements as to the conditions under which it occurs are conflicting and a practical manufacturing process cannot be deduced from them.

By the present invention the fermentation of cellulose is conducted under the following conditions:—

1. The fermenting mass is aerated in a known manner such as by forcing air, preferably in the form of very fine bubbles, through the mass, or by carrying on the fermentation in a shallow vessel in such a manner that a comparatively large surface is exposed to the air.

2. Inoculation is made from a mixture of organisms and the mass is well circulated in a manner not too violent, a fluid condition being maintained by suitable dilution of the mass so as to procure uniform conditions of aeration, acidity and temperature. There is no necessity to select any species of bacterium; the required organisms are very wide-spread, and inoculation may be made from almost any form of fermenting vegetable matter, such as stable manure, pond mud, septic sewage tank mud; even soil and chaff will generally serve as a source of the organisms.

3. The fermentation is carried on in presence of a substance which will maintain the fermenting mass substantially neutral, such as finely divided calcium carbonate.

4. The fermentation may proceed at such widely varying temperatures as 25° C., 35° C. and 60° C. and requires the known inorganic nutrients such as potash, phosphoric acid, magnesia and nitrogen. The nitrogen may be in the form of organic or inorganic compounds or as ammonium salts.

5. Vigorous fermentation is produced as soon as possible after inoculation by the use of a primer consisting of a more soluble and easily fermentable carbohydrate, such as one of the sugars, starches or the degradation products of the cellulose itself, which products include those forms of cellulose which cannot be considered as typical cellulose in that they are more readily soluble in caustic alkali solutions than is pure cotton cellulose; such forms may of course be present in the original cellulose, in which case their addition is seldom necessary.

Under these conditions, especially when the fermentation is carried out at 60° C. the action is sufficiently rapid, uniform and complete, to be useful for the manufacture of such products as acetic and similar fatty acids and combustible gases. For the useful production of the last named the aeration is not inimical if it be conducted judiciously, such as by introducing air under such conditions that the oxygen thereof is dissolved substantially at the rate at which it is introduced; for instance by forcing the air into the liquid through a finely porous diaphragm or by mixing the liquid with a portion of it which has been aerated under pressure.

When unprepared cellulose, such as straw, is used, nitrogen contained in it appears among the products as ammonia and any sulphates present are reduced to sulphides.

For example a 50 gallon stoneware vessel loosely covered and externally heated to 60° C. by a water jacket is fitted with a stirrer and an aerator and charged with 40 gallons of aerated tap water, 5 lbs. sulphite pulp half stuff, 3 lbs. precipitated chalk, ¼ lb. glucose; the necessary mineral nutrient consisting of ¼ lb. each of ammonium chloride, sodium chloride and potassium phosphate and about 1 lb. of material from the centre of a steaming stable-manure heap. The stirrer is put into action until the charge is mixed and the whole allowed to stand 12–24 hours until the cellulose fibres begin to rise to the surface. The mass is then gently stirred and aerated for an hour or two, once or twice a day until fermentation becomes too slow, or the cellulose is almost exhausted, when the action may be continued by the addition of more primer or more cellulose, or both. Loss by evaporation is made good by the addition of water as required. In this way, a solution of calcium acetate is obtained from which acetic acid or calcium acetate may be obtained by evaporation or extraction in a known manner.

The fermentation may be carried out at such temperatures as 25° C. and 35° C. and the other conditions are similar to those for the 60° C. fermentation, while the results are not substantially different except as regards rates of fermentation.

Having thus described the nature of the said invention and the best means I know of carrying the same into practical effect, I claim:—

1. The process of obtaining valuable products from cellulose which comprises the direct fermentation of cellulose by means of living organisms from fermenting vegetable matter and nutrient materials, whilst conducting the operations under aerobic conditions at a temperature not exceeding about 70° C., and keeping the mass substantially neutral.

2. The process of obtaining valuable products from cellulose which comprises the direct fermentation of cellulose at a temperature not exceeding about 70° C., by means of living organisms from fermenting vegetable matter and nutrient materials whilst conducting the operations under aerobic conditions, keeping the mass substantially neutral, and recovering the valuable products of a boiling point up to 168° C., from the mass.

3. The process of obtaining valuable products from cellulose which comprises the direct fermentation of cellulose at a temperature not exceeding about 70° C., by means of living organisms from fermenting vegetable matter and nutrient materials whilst forcing air in the form of very fine bubbles through the mass undergoing fermentation, keeping the mass substantially neutral, and recovering the valuable products of a boiling point up to 168° C., from the mass.

4. The process of obtaining valuable products from cellulose which comprises the direct fermentation of cellulose at a temperature not exceeding about 70° C., by means of living organisms from fermenting vegetable matter and nutrient materials, exposing a comparatively large surface of the mass undergoing fermentation to air whilst keeping the mass substantially neutral, and recovering the valuable products of a boiling point up to 168° C., from the mass.

5. Process for the production of fatty acids of a boiling point up to 168° C., from cellulose which comprises fermenting cellulose at a temperature not exceeding about 70° C., by introducing aerated tap water, sulphite pulp half stuff, precipitated chalk and glucose and nutrient substances composed of ammonium chloride and sodium chloride and potassium phosphate and material from the centre of a steaming stable manure heap, stirring the mixture and allowing it to stand for 12-24 hours, thereupon continuing said stirring and introducing air during 1-2 hours, repeating the operations until fermentation ceases, and recovering the calcium salt of the fatty acid formed from the mixture.

In testimony whereof I have signed my name to this specification.

HERBERT LANGWELL.